US008700082B2

(12) United States Patent
Borran et al.

(10) Patent No.: US 8,700,082 B2
(45) Date of Patent: Apr. 15, 2014

(54) POWER CONTROL UTILIZING MULTIPLE RATE INTERFERENCE INDICATIONS

(75) Inventors: Mohammad J. Borran, San Diego, CA (US); Aamod Khandekar, San Diego, CA (US); Avneesh Agrawal, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1717 days.

(21) Appl. No.: 11/620,030

(22) Filed: Jan. 4, 2007

(65) Prior Publication Data

US 2009/0149140 A1 Jun. 11, 2009

Related U.S. Application Data

(60) Provisional application No. 60/756,959, filed on Jan. 5, 2006.

(51) Int. Cl.
*H04W 52/04* (2009.01)

(52) U.S. Cl.
USPC .......................................... 455/522; 370/318

(58) Field of Classification Search
USPC .......................................... 455/522; 370/318
See application file for complete search history.

(56) References Cited

U.S. PATENT DOCUMENTS

| 6,587,697 | B2 | 7/2003 | Terry et al. |
| 7,069,035 | B2 | 6/2006 | Chen et al. |
| 7,286,486 | B2 * | 10/2007 | Marinier et al. ............. 370/252 |
| 7,412,254 | B2 | 8/2008 | Senarath et al. |
| 7,512,412 | B2 * | 3/2009 | Mese et al. .................... 455/522 |
| 7,555,300 | B2 * | 6/2009 | Scheinert et al. ............ 455/450 |
| 7,773,699 | B2 * | 8/2010 | Jia et al. ........................ 375/341 |
| 8,290,023 | B2 * | 10/2012 | Myers et al. .................. 375/146 |
| 8,320,430 | B2 * | 11/2012 | Myers et al. .................. 375/150 |

(Continued)

FOREIGN PATENT DOCUMENTS

| CA | 2392574 A1 | 1/2004 |
| CA | 2392574 A1 * | 1/2004 |

(Continued)

OTHER PUBLICATIONS

International Preliminary Report on Patentability-PCT/US2007/060193, International Bureau of WIPO-Geneva, Switzerland-Jul. 8, 2008.

(Continued)

*Primary Examiner* — Bobbak Safaipour
(74) *Attorney, Agent, or Firm* — Howard Seo

(57) ABSTRACT

Systems and methodologies are described that facilitate mitigation of interference in a wireless communication environment. Terminals can utilize interference information provided by neighboring sectors to adjust transmit power and reduce interference. Access points can provide two sets or types of interference information. The first type can be transmitted over a large coverage area, requiring significant overhead and limiting the transmission rate. Access points can also provide a second set or type of interference information directed at smaller coverage area, such as an area proximate to the edge of the supported sector. This second type of interference information can be utilized by terminals that include the access point within their active set. The second set of interference information can be provided at a higher rate than the first set due to decreased overhead requirements. Terminals can utilize both sets of interference information to adjust transmit power.

49 Claims, 13 Drawing Sheets

(56) References Cited

U.S. PATENT DOCUMENTS

| | | | |
|---|---|---|---|
| 8,385,467 B2* | 2/2013 | Han et al. | 375/299 |
| 2002/0168963 A1 | 11/2002 | Wajs | |
| 2002/0168994 A1 | 11/2002 | Terry et al. | |
| 2003/0027535 A1* | 2/2003 | Blair et al. | 455/127 |
| 2003/0050090 A1* | 3/2003 | Raffel et al. | 455/552 |
| 2003/0125068 A1* | 7/2003 | Lee et al. | 455/522 |
| 2004/0132460 A1* | 7/2004 | Lee | 455/453 |
| 2004/0198452 A1* | 10/2004 | Roy | 455/562.1 |
| 2004/0203968 A1* | 10/2004 | Gopalakrishnan et al. | 455/512 |
| 2005/0094550 A1* | 5/2005 | Huh et al. | 370/203 |
| 2005/0283687 A1* | 12/2005 | Sutivong et al. | 714/712 |
| 2006/0019694 A1* | 1/2006 | Sutivong et al. | 455/522 |
| 2006/0073791 A1* | 4/2006 | Senarath et al. | 455/67.13 |
| 2006/0120321 A1* | 6/2006 | Gerkis et al. | 370/329 |
| 2006/0285585 A1* | 12/2006 | Sampath | 375/227 |
| 2007/0087707 A1* | 4/2007 | Blair et al. | 455/127.1 |
| 2007/0270100 A1* | 11/2007 | Agrawal et al. | 455/67.11 |
| 2008/0037439 A1* | 2/2008 | Cave et al. | 370/252 |
| 2008/0076408 A1* | 3/2008 | Katayama et al. | 455/424 |
| 2008/0214121 A1* | 9/2008 | Sutivong et al. | 455/67.13 |
| 2010/0029211 A1* | 2/2010 | Teague | 455/63.1 |
| 2011/0212740 A1* | 9/2011 | Senarath et al. | 455/501 |
| 2012/0083302 A1* | 4/2012 | Borran et al. | 455/501 |
| 2012/0214523 A1* | 8/2012 | Senarath et al. | 455/501 |

FOREIGN PATENT DOCUMENTS

| | | |
|---|---|---|
| EP | 1353455 | 10/2003 |
| EP | 1353455 A1 | 10/2003 |
| JP | 2001339342 A | 12/2001 |
| JP | 2001339342 A | 12/2001 |
| JP | 2006074811 A | 3/2006 |
| JP | 2006074811 A | 3/2006 |
| RU | 2145446 | 2/2000 |
| SU | 1725225 | 4/1992 |
| WO | 02080400 | 10/2002 |
| WO | WO02080400 | 10/2002 |
| WO | 2005036909 | 4/2005 |
| WO | WO2005036909 | 4/2005 |
| WO | 06007318 | 1/2006 |
| WO | 2006007318 A1 | 1/2006 |

OTHER PUBLICATIONS

International Search Report-PCT/US2007/060193, International Searching Authority-European Patent Office-Jan. 30, 2008.
Taiwanese Search report—096100616—TIPO—Jun. 17, 2010.
Written Opinion-PCT/US2007/060193, International Searching Authority-European Patent Office-Jan. 30, 2008.

* cited by examiner

POWER CONTROL UTILIZING MULTIPLE RATE INTERFERENCE INDICATIONS

CROSS-REFERENCE

This application claims the benefit of U.S. Provisional Application Ser. No. 60/756,959 entitled "METHOD OF POWER CONTROL USING MULTIPLE-RATE OTHER SECTOR INTERFERENCE INDICATIONS." filed on Jan. 5, 2006. The entirety of the above-referenced application is incorporated herein by reference.

BACKGROUND

I. Field

The following description relates generally to wireless communications, and, amongst other things, to mitigation of interference.

II. Background

Wireless networking systems have become a prevalent means by which a majority of people worldwide has come to communicate. Wireless communication devices have become smaller and more powerful in order to meet consumer needs and to improve portability and convenience. Consumers have become dependent upon wireless communication devices such as cellular telephones, personal digital assistants (PDAs) and the like, demanding reliable service, expanded areas of coverage and increased functionality.

Generally, a wireless multiple-access communication system may simultaneously support communication for multiple wireless terminals or user devices. Each terminal communicates with one or more access points via transmissions on the forward and reverse links. The forward link (or downlink) refers to the communication link from the access points to the terminals, and the reverse link (or uplink) refers to the communication link from the terminals to the access points.

Wireless systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Typically, each access point supports terminals located within a specific coverage area referred to as a sector. A sector that supports a specific terminal is referred to as the serving sector. Other access points, not supporting the terminal, are referred to as non-serving sectors. The term "sector" can refer to an access point and/or an area covered by an access point, depending upon context. Terminals within a sector can be allocated specific resources (e.g. time and frequency) to allow simultaneous support of multiple terminals. However, transmissions by terminals in neighboring sectors may not be coordinated. Consequently, transmissions by terminals in neighboring sectors can cause interference and degradation of terminal performance.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with mitigating interference in a wireless system. Generally, sectors transmit interference communications that are used by terminals in neighboring sectors to adjust transmit power and minimize interference. These interference communications are referred to herein as other sector interference (OSI) communications. However, to penetrate neighboring sectors, OSI communications require significant power and resources. Due to overhead requirements, such wide coverage area transmissions generally cannot be transmitted at a high periodic rate. The relatively slow rate of transmission can be problematic if one or more terminals transmit in short bursts. Such terminals can complete transmissions before every receiving an OSI communication. To mitigate interference caused by such terminals, a second type of OSI communication can be transmitted at a faster rate and lower power than the first OSI communication. The second OSI communication is referred to herein as the fast OSI communication. The rapid transmission rate of the fast OSI communications allows terminals to adjust transmit power and minimize interference caused by the terminals.

In an aspect, a method for controlling interference is disclosed. The method includes an act of transmitting a first interference communication and an act of transmitting a second interference communication where: the second interference communication is transmitted at a higher periodic rate and lower power than the first interference communication.

In another aspect, a method of controlling terminal transmit power in a wireless environment is disclosed. The method includes an act of receiving a first interference communication from a neighboring sector and an act of receiving a second interference communication from the neighboring sector where the second interference communication is transmitted at higher periodic rate and lower power than the first interference communication. Additionally, the method includes an act of regulating transmit power for a terminal supported by a sector based at least in part upon the first interference communication and/or the second interference communication.

In yet another aspect, an apparatus that facilitates controlling interference is provided. The apparatus includes a processor that executes instructions for transmitting first interference communication on a first channel and second interference communication using a second channel where the second channel has a higher periodic rate than the first channel. As well, the apparatus includes a memory that stores interference data for a sector, the first interference communication and second interference communication are based at least in part upon the interference data.

Yet another aspect includes an apparatus that facilitates controlling interference. This apparatus includes a memory that stores information associated with transmit power of a terminal in addition to a processor. The processor executes instructions for determining the transmit power based upon a first interference communication and a second interference communication from a non-serving sector where the second interference communication is transmitted at a higher periodic rate than the first interference communication.

Another aspect includes an apparatus that facilitates control of interference. The aspect includes means for generating a first interference output, means for generating a second interference output, means for transmitting the first interference output on a first channel, and means for transmitting the second interference output on a second channel where the second channel is at a higher periodic rate than the first channel and the first interference output and the second interference output, are used to manage transmit power for a terminal in a neighboring sector.

An apparatus that facilitates mitigating interference is disclosed in another aspect. This apparatus includes means for obtaining a first interference output and a second interference output from a non-serving sector and means for managing transmit, power of a terminal as a function of the first interference output and/or the second interference output.

Another aspect discloses a computer-readable medium having instructions for transmitting first other sector interference output, to a terminal and transmitting second other sector interference output to the terminal where the first other sector interference output is transmitted at a lower periodic rate than the second other sector interference output and transmit power level is regulated based upon the first other sector interference output and the second other sector interference output.

Yet another aspect discloses a computer-readable medium having instructions for obtaining a first other sector interference output, from a non-serving sector, obtaining a second other sector interference output from the non-serving sector, and managing transmit power for a terminal based at least in part upon the first other sector interference output and the second other sector interference output where the second other sector interference output is obtained at a higher periodic rate than the first other sector interference output.

A processor that executes computer-executable instructions that facilitate mitigation of interference is disclosed with regard to another aspect. Here, the instructions include transmitting a first interference communication based at least in part upon amount of interference observed by a sector, and transmitting a second interference communication based at least in part upon the amount of interference where the first interference communication is transmitted on a first channel and the second interference communication is transmitted on a second channel and the second channel has a higher periodic transmission rate than the first channel, transmit power of a terminal supported by a neighboring sector is controlled based at, least in part upon the first interference communication and the second interference communication.

In still other aspects, a processor that executes computer-executable instructions that facilitate mitigation of interference is provided. In these aspects, the instructions include receiving a first interference communication based at least in part upon amount of interference observed by a neighboring sector and receiving a second interference communication based at least in part upon the amount of interference. Further, the instructions include performing a first adjustment, of the transmission power of a terminal supported by a sector as a function of the first interference communication and performing a second adjustment the transmission power of the terminal as a function of the second interference communication.

To the accomplishment of the foregoing and related ends, the one or more aspects comprise the features herein after fully described and particularly pointed out in the claims. The following description and the annexed drawings set forth in detail certain illustrative aspects. These aspects are indicative, however, of but a few of the various ways in which the principles described herein may be employed and the described are intended to include their equivalents.

DETAILED DESCRIPTION

Figure 1:
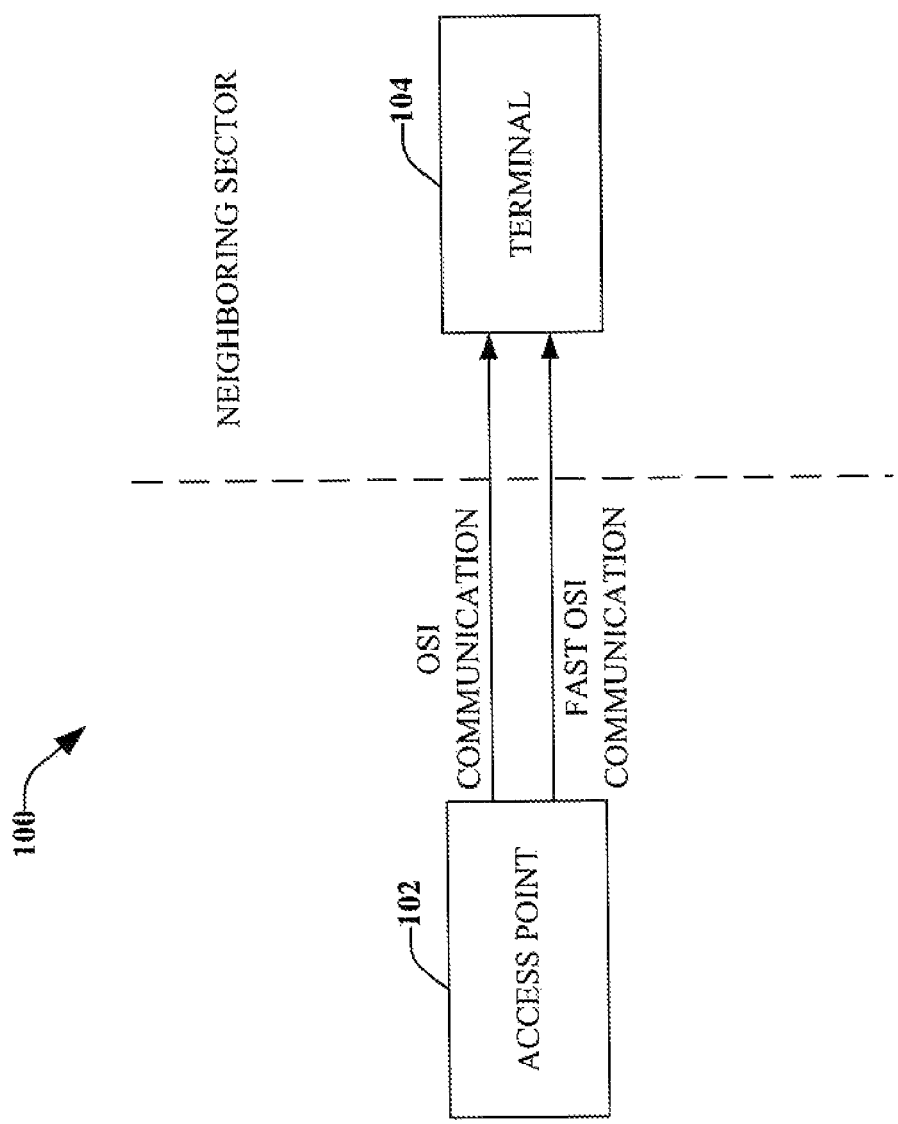
FIG. 1 is a block diagram of a system that facilitates control of transmission power in accordance with one or more aspects presented herein.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "system," and the like are intended to refer to a computer-related entity, either hardware, a combination of hardware and software, software, or software in execution. For example, a component may be, hut is not limited to being, a process running on a processor, a processor, an object, an executable, a thread of execution, a program, and/or a computer. By way of illustration, both an application running on a communications device and the device can be a component. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection, with a terminal. A terminal can also be called a system, a user device, a subscriber unit, subscriber station, mobile station, mobile device, remote station, access point, base station, remote terminal, access terminal, user terminal, terminal, user agent, or user equipment (UE). A terminal can be a cellular telephone, a cordless telephone, a Session Initiation Protocol (SIP) phone, a wireless local loop (WLL) station, a PDA, a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Typically, in an orthogonal multiple access wireless system, terminals regulate their transmission power to minimize or mitigate interference for neighboring, non-serving sectors. Sectors can broadcast interference communications that reflect the level of interference within the sector. These interference communications are referred to herein as other sector interference (OSI) communications. Terminals in neighboring sectors can utilize the information within OSI communications and various power control algorithms to regulate transmission power to minimize or mitigate inter-sector interference. The power control algorithms can allow each terminal to transmit at as high a power level as possible while keeping inter-sector interference within acceptable levels.

OSI communications include data that is indicative of interference within a sector. The interference data can be based upon observations, computations and/or estimations of interference, OSI communication can utilize any format (e.g., single bit, integer, floating point, enumerated type) that reflects the interference.

Terminals can adjust transmission power based upon the received OSI communications. In particular, each terminal can set transmission power based upon interference information, previous transmission power levels utilized by the terminal and/or a measure of channel strengths between the terminal and the non-serving sectors. In cases where signal distortions caused by physical channel result in loss of orthogonality and therefore intra-sector interference, the terminal can also take into account the requirements on the dynamic range of the received signal when adjusting power control.

OSI communications can be carried over a special channel or channels designated for this purpose, referred to herein as OSI channels. For example, the proposed IEEE 802.20 protocol, which provides standards for Mobile Broadband Wireless Access (MBWA), includes an F-OSICH channel. OSI communications are used by access terminals located in sectors neighboring the transmitting sector. Therefore, the channel utilized for OSI communications can cover a large area to penetrate into neighboring sectors. For instance, the OSI channel can have the same coverage area as acquisition pilots broadcast by the transmitting sector. Similar to acquisition pilots, the OSI channel can penetrate far into neighboring sectors.

The OSI channel can be relatively expensive in terms of the required power and time-frequency resources. Power requirements can be significant due to the large coverage area necessary to communicate with terminals located deep within neighboring sectors. In addition, the OSI channel can be decodable without requiring receiving terminals to have information regarding transmitting sector, other than a sector identifier (e.g., Pilot PN) assigned to the sector. Due to the relatively large overhead requirement, the rate at which OSI information is transmitted over the OSI channel is limited. For instance, interference information can be transmitted once every superframe, where a superframe is a collection of frames.

The relatively slow periodic rate of OSI communications is adequate to control interference for many situations. For example, for a fully loaded network, OSI communication rate (e.g., once-per-superframe) is sufficient to control the amount of other sector interference. This results in a relatively tight distribution for the ratio of other sector interference over thermal noise (IoT).

For certain scenarios the typical OSI communication rate can be insufficient. For example, in partially loaded systems, if a single access terminal located near the boundary of two sectors suddenly starts a new transmission after a long period of silence, it can cause a significant amount of interference to the reverse link transmissions of terminals in neighboring sectors. Using a typical OSI channel, it can take several superframe durations for the neighboring sector to force the terminal to lower transmit power to an acceptable level. During this time period, reverse link transmission in neighboring sectors can suffer from severe interference, possibly resulting in packet errors. Frequently, a single terminal or small set of terminals causes most of observed interference for a sector. In particular, terminals that generate relatively short bursts of transmissions can cause a great deal of interference. Such terminals can come and go very quickly and can complete transmissions before receiving any interference information provided at the relatively low OSI communication rate.

With reference now to the drawings. FIG. 1 illustrates a block diagram of a system 100 that mitigates interference. System 100 includes at least one access point 102 and at least one terminal 104 supported by a neighboring sector of access point 102. A single access point and terminal are illustrate for simplicity. However, system 100 can include multiple access points and terminals. Access point 102 can provide interference information by transmitting an OSI communication over a typical OSI channel (e.g., F-OSICH). The OSI communication can be an independent transmission over a designated channel or can be a block included within a transmission. The access point 102 can transmit a second type of OSI communication, referred to herein as fast OSI, at a higher rate and lower power than the OSI communication. Terminal 104 can receive and utilize both the OSI communications and fast OSI communications.

In aspects, access terminals that include the transmitting-non-serving sector with their active set can receive and decode the fast OSI communication. Long term channel qualities on forward and reverse links are often highly correlated. Therefore, a terminal causing strong interference at a non-serving sector on the reverse link, will most likely observe a strong signal (e.g., pilot) from that non-serving sector on the forward link. Consequently, the terminal will likely include the non-serving sector in which it is causing interference within the terminal's active set. If the transmitting sector is included in the active set, the terminal will have a Media Access Control Identifier (MAC-ID) and dedicated control resources assigned by the transmitting sector. Therefore, the terminal can decode certain limited signals received from the non-serving sector, including fast OSI communications.

The terminal can decode portions of a resource assignment channel, such as the shared signaling channel (F-SSCH) as defined in the proposed IEEE 802.20 protocol. The resource assignment channel can include forward link control signaling. Resources can be assigned via the resource assignment channel and can be present in every physical layer (PHY) frame from the transmitting sector, including the forward and reverse link assignment blocks in the case of a handoff. The resource assignment channel can also include power and/or interference information (e.g., fast OSI) that can be decoded by the terminal. Accordingly, sectors can transmit control information including other sector interference information to terminals that include the sector in their active set.

In one or more aspects, a fast OSI communication can be included in a segment of the resource assignment channel (e.g., F-SSCH), called a fast OSI segment, in addition to regular-OSI communications on an OSI channel (e.g., F-OSICH). The interference information within the fast OSI communication is intended for a limited set of terminals, those that have the transmitting sector within their active set. Consequently, the coverage area can be smaller than that used for typical OSI communications. Terminals that have the transmitting sector within their active set will be able to decode the fast OSI segment. Moreover, the resource assignment channel can be present in every forward link physical layer frame (FL PHY frame). Consequently, fast OSI communications can be transmitted as rapidly as once every FL PHY frame. The increased delivery rate for interference, information provides for rapid adjustment of terminal transmit power and facilitates mitigation of interference generated by terminals emitting bursts of transmissions. Access points utilizing fast OSI communications can more rapidly suppress interference from access terminals in the neighboring sectors, before the terminals cause packet errors in the transmitting sector. Access points can provide both typical OSI communications and fast OSI communications. System 100 can be utilized in a variety of multiple access systems, including, but not limited to, a CDMA system, a TDMA system, an FDMA system, an OFDMA system, an interleaved frequency division multiple access (IFDMA) system and a localized frequency division multiple access (LED MA) system.

Figure 2:
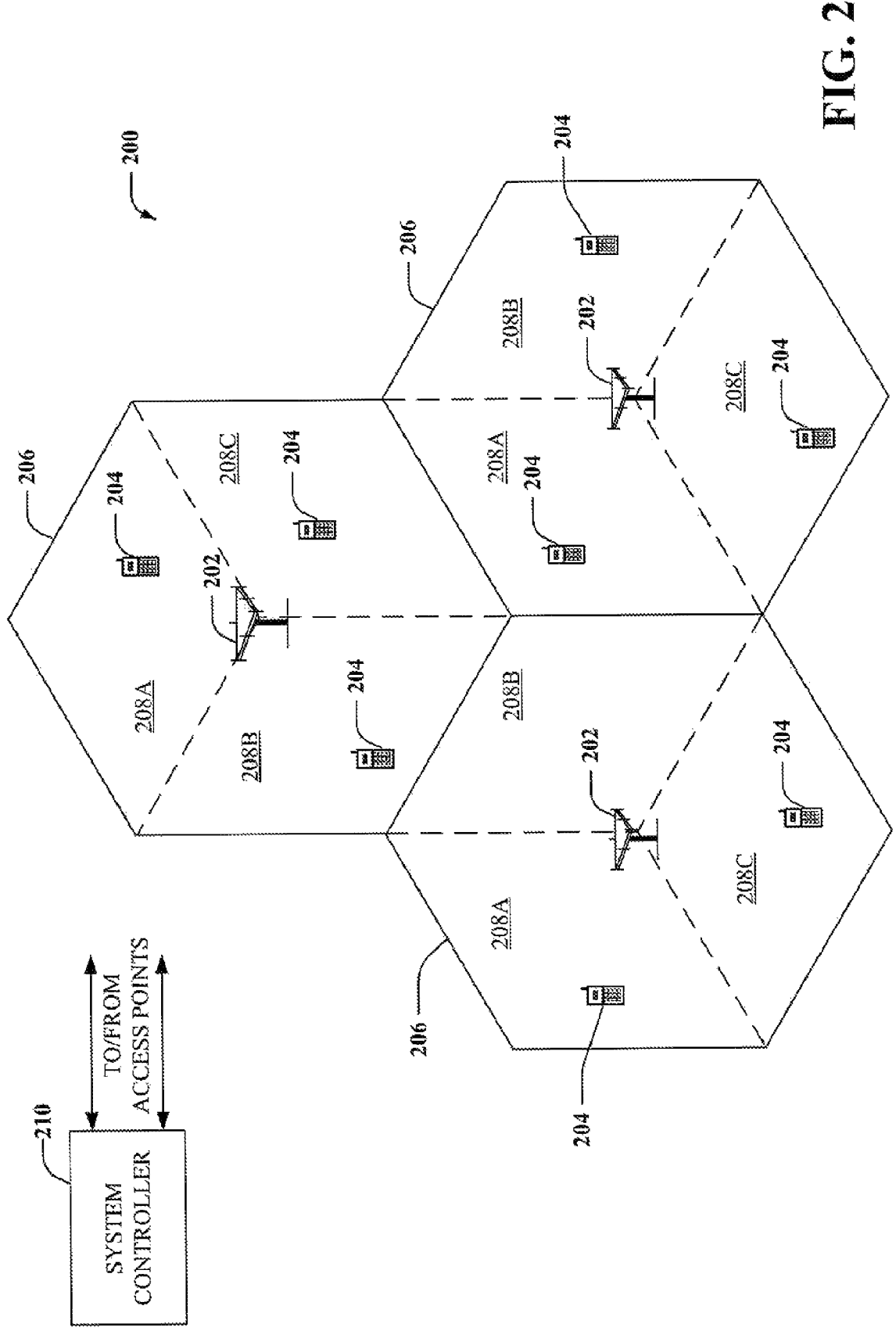
FIG. 2 is an illustration of a wireless communication system in accordance with one or more aspects presented herein.

Referring now to FIG. 2, a wireless communication system 200 in accordance with various aspects presented herein is illustrated. System 200 can comprise one or more access points 202 that receive, transmit, repeat, etc., wireless communication signals to each other and/or to one or more terminals 204. Each access point 202 can comprise multiple transmitter chains and receiver chains, e.g., one for each transmit and receive antenna, each of which can in turn comprise a plurality of components associated with signal transmission and reception (e.g., processors, modulators, multiplexers, demodulators, demultiplexers, antennas, etc.). Terminals 204 can be, for example, cellular phones, smart phones, laptops, handheld communication devices, handheld computing devices, satellite radios, global positioning systems, PDAs, and/or any other suitable device for communicating over wireless system 200. In addition, each terminal 204 can comprise one or more transmitter chains and a receiver chains, such as used for a multiple input multiple output (MIMO) system. Each transmitter and receiver chain can comprise a plurality of components associated with signal transmission and reception (e.g., processors, modulators, multiplexers, demodulators, demultiplexers, antennas, etc), as will be appreciated by one skilled in the art.

As illustrated in FIG. 2, each access point provides communication coverage for a particular geographic area 206. The term "cell" can refer to an access point and/or its coverage area, depending on context. To improve system capacity, an access point coverage area can be partitioned into multiple smaller areas (e.g., three smaller areas 208A, 208B and 208C). Each smaller area is served by a respective base transceiver subsystem (BTS). The term "sector" can refer to a BTS and/or its coverage area depending upon context. For a sectorized cell, the base transceiver subsystem for all sectors of the cell is typically co-located within the access point for the cell.

Terminals 204 are typically dispersed throughout system 200. Each terminal 204 may be fixed or mobile. Each terminal 204 may communicate with one or more access points 202 on the forward and reverse links at any given moment.

For a centralized architecture, a system controller 210 couples access points 202 and provides coordination and control of access points 202. For a distributed architecture, access points 202 may communicate with one another as needed. Communication between access points either directly, or via the system controller 210 or the like can be referred to as backhaul signaling.

The techniques described herein may be used for a system 200 with sectorized cells as well as a system with un-sectorized cells. For clarity, the following description is for a system with sectorized cells. The term "access point" is used generically for a fixed station that serves a sector as well as a fixed station that serves a cell. The terms "terminal" and "user" are used interchangeably, and the terms "sector" and "access point" are also used interchangeably. A serving access point/sector is an access point/sector with which a terminal communicates. A neighbor access point/sector is an access point/sector with which a terminal is not in communication.

Figure 3:
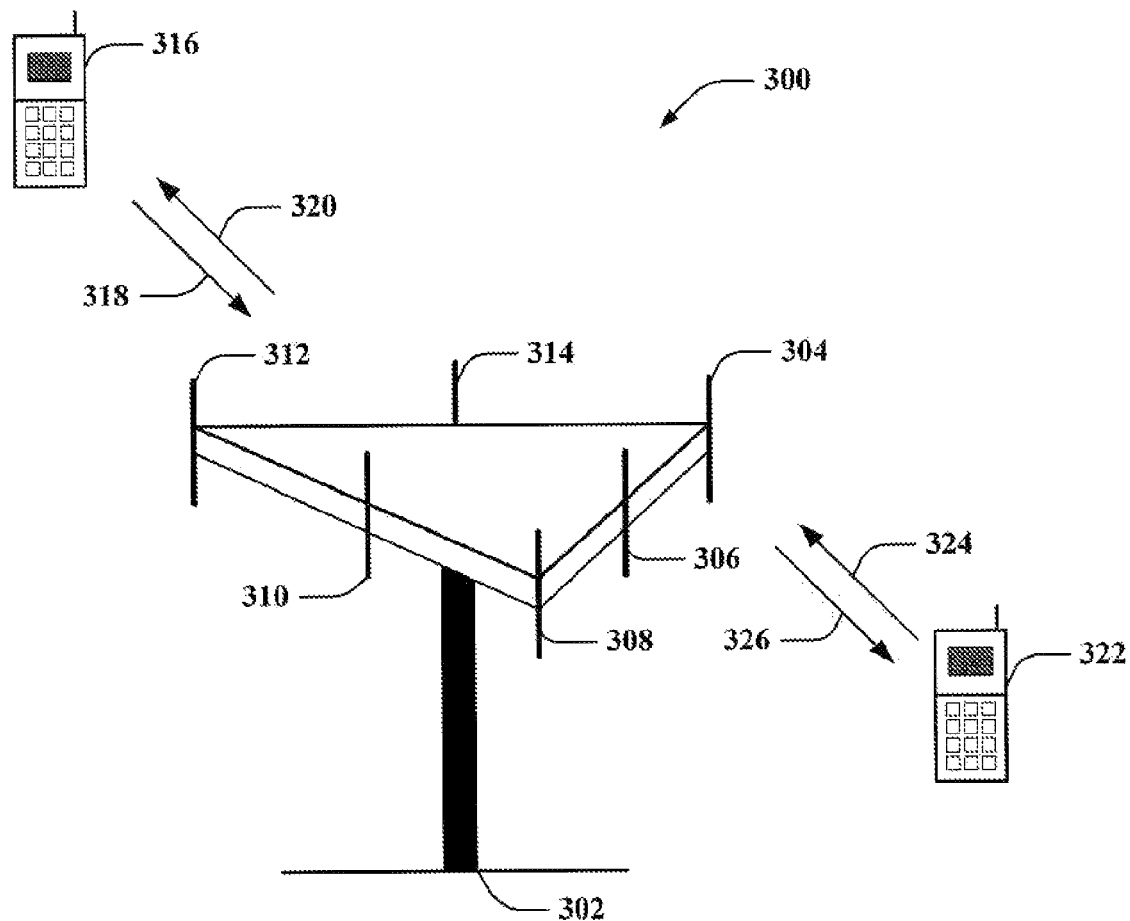
FIG. 3 is an illustration of a wireless communication system in accordance with one or more aspects presented herein.

Referring now to FIG. 3, an exemplary multiple access wireless communication system 300 according to one or more aspects is illustrated. A 3-sector access point 302 includes multiple antenna groups, one including antennas 304 and 306, another including antennas 308 and 310, and a third including antennas 312 and 314. According to the figure, only two antennas are shown for each antenna group, however, more or fewer antennas may be utilized for each antenna group. Terminal 316 is in communication with antennas 312 and 314, where antennas 312 and 314 transmit information to terminal 316 over forward link 320 and receive information from terminal 316 over reverse link 318. Terminal 322 is in communication with antennas 304 and 306, where antennas 304 aid 306 transmit information to terminal 322 over forward link 326 and receive information from terminal 322 over reverse link 324.

Each group of antennas and/or the area in which they are designated to communicate may be referred to as a sector of access point 302. In one or more aspects, antenna groups each are designed to communicate to terminals in a sector or the areas covered by access point 302. Each access point can provide coverage for a plurality of sectors.

Wireless communication systems can include one or more access points 302 in contact with one or more terminals 316, 322. The coverage areas of the access points can overlap. Consequently, terminals can be located within the coverage area of multiple access points.

Typically, when a terminal is within the coverage area provided by multiple access points, an access point and serving sector is selected based upon the signal strength of the pilot or signal transmission from the access point to the terminal. The signal strength can be measured in terms of the radio frequency (RF) path loss, where the path loss is the power loss that occurs when radio waves move through space along a specific path. In order to determine the path loss, all access points within the network can transmit signals at a predetermined power. The terminal can then measure the power of each of the received signals to determine the access point with the strongest signal strength. Alternatively, the signals can be transmitted at an undetermined power and the transmit power can be encoded in the signal or in another channel. The terminal can then compare the difference between the transmitted and received powers to determine the access point with the strongest signal strength. The terminal can maintain a list of access points with signal strength greater than a predefined threshold referred to as the active set.

Referring to FIGS. 4-8, methodologies for mitigation of interference are illustrated. While, for purposes of simplicity of explanation, the methodologies are shown and described as a series of acts, it is to be understood and appreciated that the methodologies are not limited by the order of acts, as some acts may, in accordance with, one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with one or more aspects.

Figure 4:
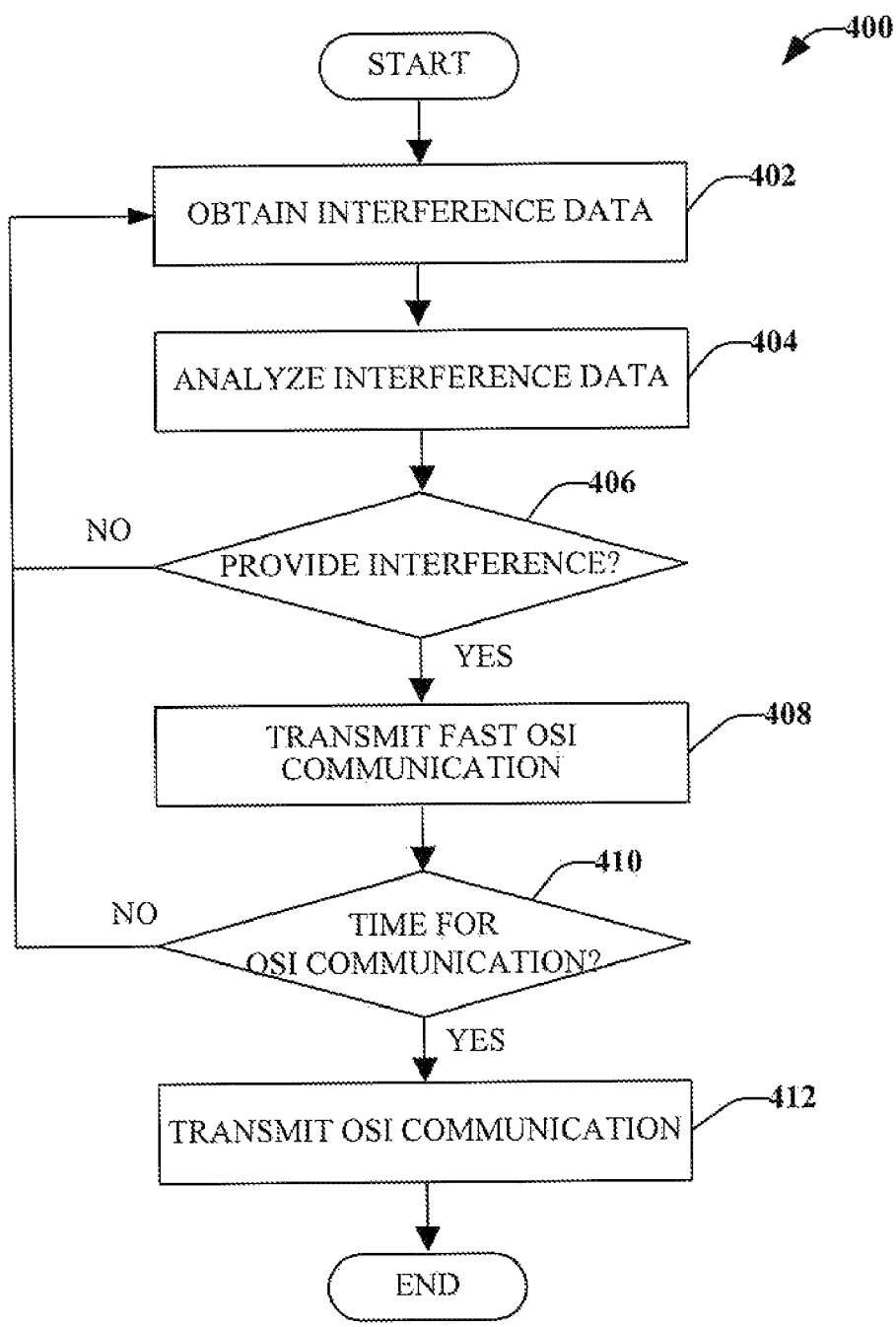
FIG. 4 illustrates a methodology for transmitting interference information in accordance with one or more aspects presented herein.

Referring now to FIG. 4, a methodology 400 for mitigating interference is illustrated. At reference numeral 402, noise or interference data can be obtained, computed or estimated. Interference data can include interference levels observed by the access point and/or terminals supported by the access point. The interference data can be analyzed at reference numeral 404. For example, the mean and/or average of the interference levels can be computed for one or more specified periods of time. Analysis can include generation of interference information that is indicative interference associated with the sector.

At reference numeral 406, a determination can be made as to whether to provide interference information to terminals in neighboring sectors. For instance, if interference is nonexistent or at an acceptable level, no information need be provided to terminals. In particular, the interference data can be compared to one or more predetermined thresholds. If the interference information is not to be provided, the process continues at reference numeral 402, where additional interference data is obtained.

If interference information is to be provided to terminals in neighboring sectors, the process continues at reference numeral 408, where interference information can be transmitted using a fast OSI communication. In particular, interference information can be transmitted over a segment (e.g., fast OSI segment) in a resource assignment channel (e.g., the F-SSCH).

In addition to the fast OSI communication, interference information can also be provided in an OSI communication. At reference numeral 410, a determination is made as to whether it is time to transmit the traditional OSI information. If no, the process returns to reference numeral 402, where additional interference data can be obtained. If it is time to transmit OSI information, then at reference numeral 412, the OSI communication can be provided to terminals.

Figure 5:
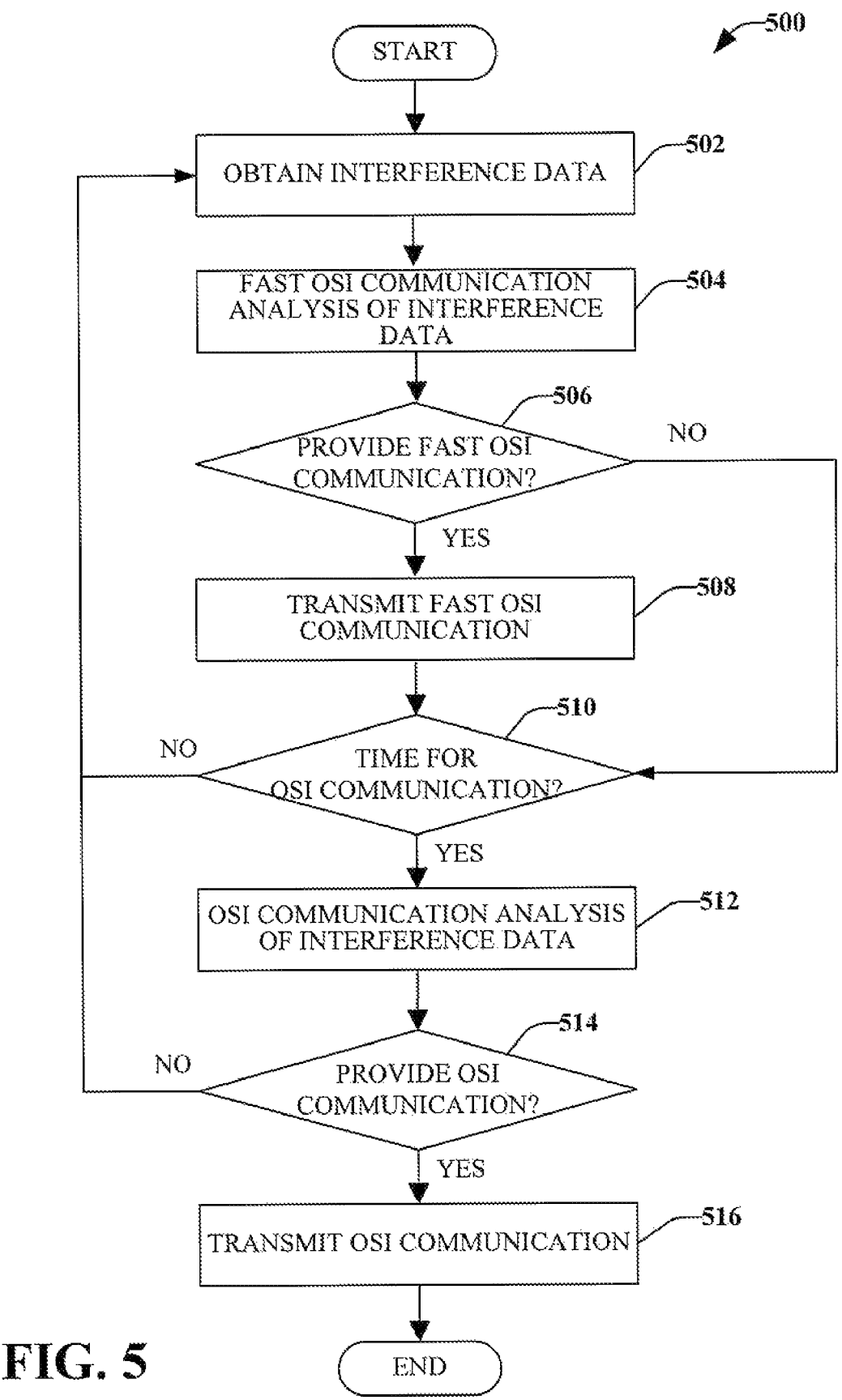
FIG. 5 illustrates a methodology for transmitting interference information in accordance with one or more aspects presented herein.

Turning now to FIG. 5, another methodology 500 for providing separate OSI and fast OSI communication is illustrated. In the methodology depicted in FIG. 4, the same algorithm was used to generate both OSI communications and fast OSI communications. However, separate and/or distinct algorithms or analyses can be performed to generate fee fast OSI communications and OSI communications. Independent analyses can be performed to reflect different statistical properties of interference data. For example, OSI communications can be based upon a long-term average of interference level and fast OSI communications can be based upon short-term interference level measurements. Here, fast OSI communications can be used to adjust terminal transmit power and control the mean interference level, while fast OSI information can be used to control the tail of the interference levels distribution.

Referring again to FIG. 5, at reference numeral 502, noise or interference data can be obtained, computed and/or estimated. At reference numeral 504, interference data can be evaluated and/or analyzed specifically for fast OSI communication. For example, interference data can be evaluated over a relatively short period of time. At reference numeral 506, a determination can be made as to whether a fast OSI communication is to be provided to terminals. In particular, the interference data can be compared to one or more predetermined thresholds. If yes, at reference numeral 508, the fast OSI communication, can be provided to terminals in neighboring sectors. If no, a fast OSI communication is not transmitted and the process continues at reference numeral 510

At reference numeral 510 a determination can be made as to whether it is time to transmit an OSI communication. If no, the process returns to reference numeral 502 to obtain additional interference data. If yes, a second analysis specific to an OSI communication can be performed at reference numeral 512. For example, mean value of interference data over an extended time period can be evaluated. At reference numeral 514, a determination can be made as to whether an OSI communication is to be provided to one or more terminals. If no, the process can return to reference numeral 502 where additional interference data can be obtained. If yes, an OSI communication can be transmitted at reference numeral 516.

Figure 6:
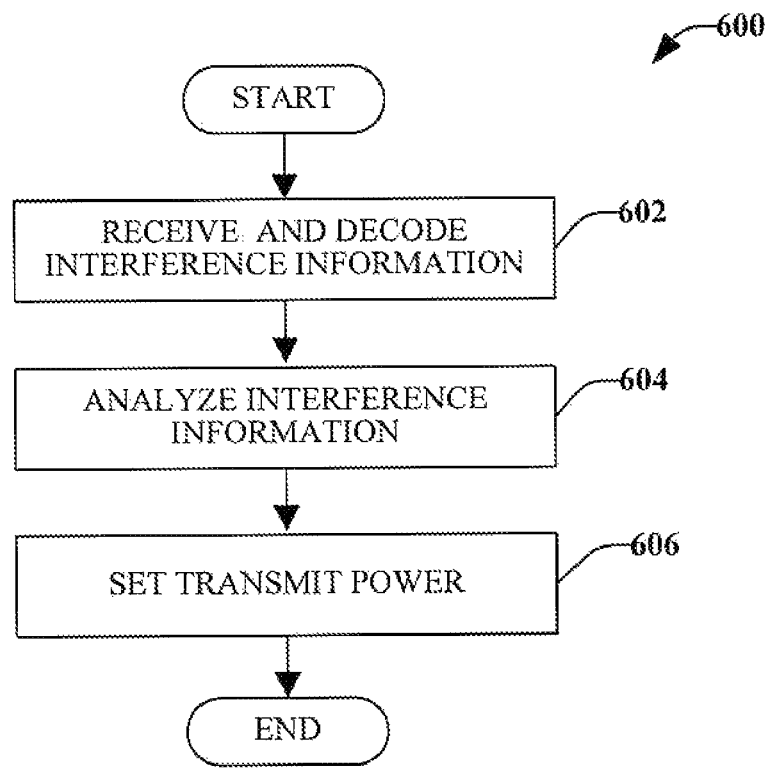
FIG. 6 illustrates a methodology for controlling transmission power for a terminal based upon interference information in accordance with one or more aspects presented herein.

Referring now to FIG. 6, a methodology 600 for controlling terminal transmit power to mitigate interference is illustrated. At reference numeral 602, a terminal can receive interference information based upon interference data observed at a neighboring sector. The interference information can be received in an OSI communication or a fast OSI communication at higher rate and lower power than the OSI communication. The interference information contained within the OSI or fast OSI communication can be decoded for further analysis. If the interference information is provided in an OSI communication, sufficient information will be provided to allow the terminal to decode the interference information. In addition, if the interference information is obtained via a fast OSI communication, the terminal is likely to have the information required to decode, the information. In particular, if the transmitting sector is within the active set maintained by the terminal, the terminal will have a MAC-ID and dedicated control resources associated with the transmitting sector. Consequently, the terminal will be able to decode interference information for the fast OSI communication.

At reference numeral 604, the provided interference information can be analyzed and evaluated and any change to transmit power can be computed. The transmit power level for the terminal can be adjusted as a function of the interference information. Typically, the analysis selects a power level that is as high as possible while keeping inter-sector interference within acceptable levels. The analysis can include comparisons to one or more thresholds. The analysis can determine a new transmit power level or delta or change from the previous power level. In particular, transmit power can be adjusted as a series of steps and one or more step sizes can be utilized. Step size may be selected based upon the interference information.

At reference numeral 606, the terminal can set or adjust the transmit power level based at least in part upon analysis of interference information. Interference information obtained from multiple non-serving sectors can be combined to select the appropriate power level. In addition, transmit power level can also be determined based upon terminal power capabilities and/or remaining battery power or any other suitable criteria.

Figure 7:
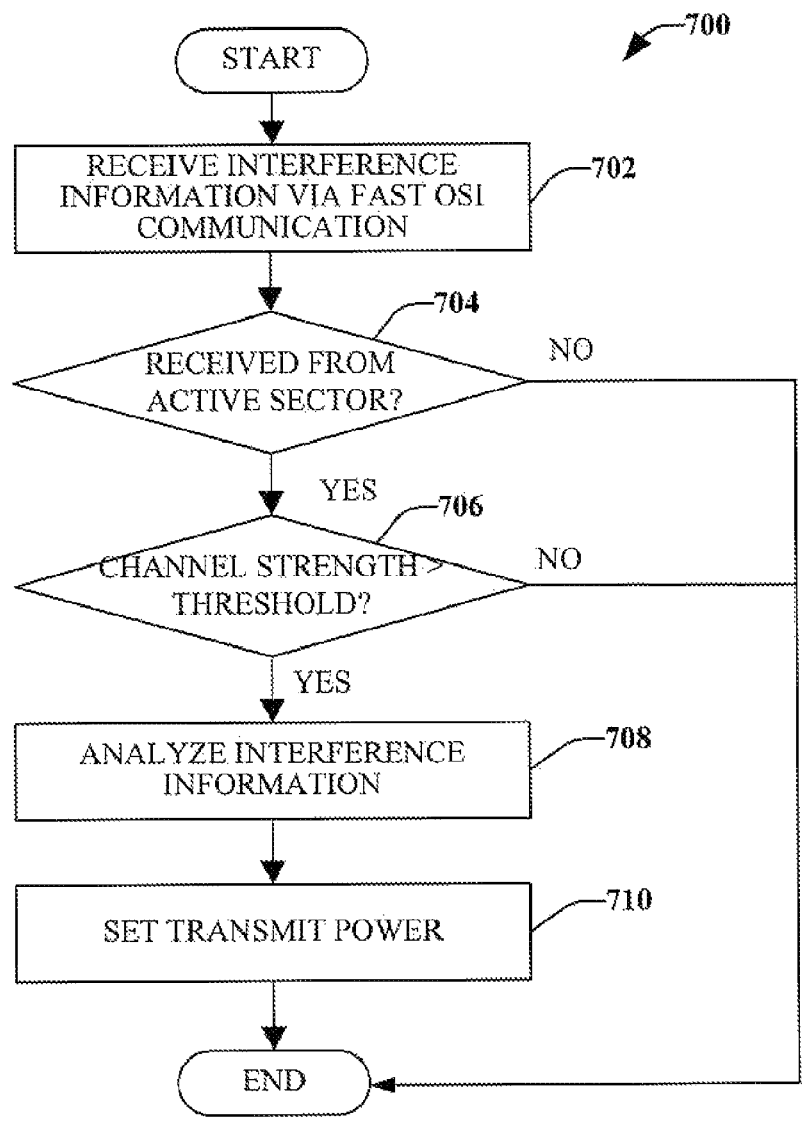
FIG. 7 illustrates a methodology for controlling transmission power for a terminal based upon interference information in accordance with one or more aspects presented herein.

Turning now to FIG. 7, a methodology 700 for processing a last OSI communication is illustrated. At reference numeral 702, a fast OSI communication containing interference information is received. In particular, a fast OSI communication can be included in a segment within a resource assignment channel. At reference numeral 704, a determination can be made if the fast OSI communication is received from an access point within, the active set of the terminal. If no, the terminal may not have the necessary information to decode the fast OSI communication and the process cat terminate.

If yes, a determination can be made as to whether the forward link channel strength is greater than a predetermined threshold at reference numeral 706. To increase reliability access terminals can respond, to fast OSI communication only from sectors whose forward link channel strength is above a predetermined threshold or is within an interval around the forward link channel strength of their serving sector. This channel strength requirement can ensure reasonable reliability for the fast OSI communication received from such transmitting sectors. Generally, the access terminal is most likely to cause significant interference for sectors where the forward and reverse links are relatively strong. Consequently, if the channel strength is either below a predetermined level or outside of a specified interval proximate to the channel strength of the serving sector, the process can terminate.

If the channel strength is sufficient, the process can continue at reference numeral 708 with analysis of received interference information. Analysis can include combining information received from multiple non-serving sectors. In addition, transmit power level can also be determined based upon terminal power capabilities and/or remaining battery power or any other suitable criteria. At reference numeral 710, the transmit power can be set or adjusted based upon the received noise interference information.

The terminal can utilize a wide variety of methods or algorithms for determining transmit power based upon interference information. In one exemplary power control protocol, during the transmission of the reverse link data, the power spectral density (PSD) of the reverse data channel (R-DCH), referred to herein as $PSD_{DCH}$, can be computed as follows:

$$PSD_{DCH} = PSD_{CTRL} \pm RDCH_{Gain} + DataCtrlOffset$$

Here, $PSD_{CTRL}$ is the reference value used by the access terminal in adjusting the mean output power of the reverse control channels, DataCtrlOffset is a parameter specified by the reverse link serving sector (RLSS), and reverse data channel gain (RDCHGain) can be determined as specified below. The power can also be subject to the access terminal's transmit power limitation and can remain constant for the entire transmission of each physical (PHY) Frame.

As shown in the equation above, power is a function of gain, RDCHGain. RDCHGain can be updated based upon received fast OSI communications, as described in detail below. Consequently, power ($PSD_{DCH}$) can be adjusted based upon received fast OSI communications.

The access terminal can monitor fast OSI communications received from a set of neighboring sectors and maintain a list of such sectors, referred to as the OSIMonitorSet. If the access terminal is monitoring the Fast OSI value on the F-SSCH of any active set member other than the RLSS, then every FL PHY frame, the access terminal can update the OSIMonitorSet with a list of identifiers (e.g., PilotPNs) of the sectors in the active set whose. Fast OSI value are being monitored by the access terminal, and whose ChanDiff values, as defined below, are smaller than or equal to a threshold referred to as the FastOSIChanDiffThreshold. FastOSIChanDiffThreshold is a configuration attribute of the power-control protocol.

At the beginning of every superframe of the RLSS, the access terminal can update the OSIMonitorSet with a list of identifiers (e.g., PilotPNs) of the sectors whose PilotStrength is larger than or equal to a predetermined threshold, referred to as OSIMonitorThreshold. The PilotPN and PilotStrength are parameters in the overhead parameter list of an overhead messages protocol. The OSIMonitorThreshold is a configuration attribute of the power control protocol.

The OSIMonitorSet can exclude the PilotPN of the RLSS. In addition, a maximum number of sectors can be included within the OSIMonitorSet. If the size of the OSIMonitorSet is larger than or equal to a predetermined maximum size, referred to as OSIMonitorSetSize, only the strongest identifiers up to the maximum number, OSIMonitorSetSize, can be maintained in the list. OSIMonitorSetSize is a configuration attribute of the power control protocol.

Each time the OSIMonitorSet is updated, the RDCHGain can be updated and the transmit power can be computed as described above. After each OSIMonitorSet update, the access terminal can create an OSI vector containing OSI information for the sectors included within the OSIMonitorSet. For example, the $i^{th}$ element of the vector (e.g., $OSI_i$) corresponds to the most recent interference information (e.g., OSIValue) from the sector whose PilotPN is indicated by the $i^{th}$ entry of the OSIMonitorSet. The most recent OSIValue can be a value received over the Fast-OSICH of the sector or over the Fast OSI Segment of the F-SSCH of the sector.

In addition, the access terminal can create a ChanDiff vector whose $i^{th}$ element, i.e., $ChanDiff_i$, can be computed as follows:

$$ChanDiff_i = \frac{RxPower_{RL,SS}}{TransmitPower_{RL,SS}} \times \frac{TransmitPower_i}{RxPower_i}$$

Here, $RxPower_{RLSS}$ and $RxPower_i$, can be contained in the public data of the Active Set Management Protocol, and correspond to the average received power (across antenna) of the acquisition channel, F-ACQCH, of the RLSS, and the average received power (across antenna) of the F-ACQCH of the sector whose PilotPN is indicated by tire $i^{th}$ entry of the OSIMonitorSet, respectively, $TransmitPower_{RLSS}$ and $TransmitPower_i$, specified in the OverheadParameterList of the overhead messages protocol, correspond to the average transmit power of the F-ACQCH of the RLSS, and the average transmit power of the F-ACQCH of the sector whose PilotPN is indicated by the $i^{th}$ entry of the OSIMonitorSet, respectively. The above calculation can be done in a linear unit. Both the OSI vector and ChanDiff vector are utilized in the computation of RDCHGain below.

If no interference information has been received, the RDCHGain can be maximized, since there are no reports of interference. For example, if the OSIMonitorSet is empty, the access terminal can set RDCHGain to a predetermined maximum value (e.g., RDCHGainMax), OSI2SequenceNum to 1 and PilotPNStrongest to a default value (e.g., −1). RDCHGainMax is a parameter in the OverheadParameterList of the Overhead Messages Protocol. OSI2Sequence is a feature that can allow terminals to accumulate OSI communications and is discussed in further detail below.

If interference information has been received, RDCHGain can be computed using a set of thresholds, referred to as the Decision Threshold vector. The access terminal can first compute a Decision Threshold vector, whose $i^{th}$ element, i.e., DecisionThreshold$_i$, 1≤i≤OSIMonitorSetSize, is given by:

$$DecisionThreshold_i = \begin{cases} \max\{UpDecisionThresholdMin, (1-a)b_i\} & \text{if } OSI_i = 0 \\ \max\{DownDecisionThresholdMin, a(1-b_i)\} & \text{if } OSI_i = 1 \\ 1 & \text{if } OSI_i = 2 \end{cases}$$

Here, UpDecisionThresholdMin and DownDecisionThresholdMin are configuration attributes of the power control protocol and OSI refers to the OSI vector described above. Variables a and $b_i$ can be determined as follows:

$$a = \frac{\min\{RDCHGain, RDCHGainMax\} - RDCHGainMin}{RDCHGainMax - RDCHGainMin}, \text{ and}$$

$$b_i = \frac{\min\{ChanDiff_i, ChanDiffMax\} - ChanDiffMin}{ChanDiffMax - ChanDiffMin},$$

Here, ChanDiffMax and ChanDiffMin are configuration attributes of the power control protocol, and all values in the above computations are in logarithmic scale (in units of dB). ChanDiff$_i$ is an element of the ChanDiff vector described above.

Decision thresholds (from different sectors) can be weighted and combined to generate a decision vector. The access terminal can produce a Decision vector whose $i^{th}$ element, i.e., Decision$_i$, 1≤i≤ OSIMonitorSetSize, is given by:

$$Decision_i = \begin{cases} UpDecisionValue & \text{if } x_i \leq DecisionThreshold_i \text{ and } OSI_i = 0 \\ -DownDecisionValue & \text{if } x_i \leq DecisionThreshold_i \text{ and } OSi_i = 1 \text{ or } 2 \\ 0 & \text{otherwise} \end{cases}$$

Here, 0≤$x_i$≤1 is a uniform random variable and UpDecisionValue and DownDecisionValue are configuration attributes of the power control protocol.

The access terminal can then compute a weighted decision, $D_w$, according to:

$$D_w = \frac{\sum_{i=1}^{OSIMonitorSetSize} \frac{1}{ChanDiff_i} Decision_i}{\sum_{i=1}^{OSIMonitorSetSize} \frac{1}{ChanDiff_i}}$$

The access terminal can find, the sector with the lowest ChanDiff in the OSIMonitorSet and designate that sector as sector k. Then the access terminal can designate the variable OSIStrongest to the OSI value of sector k and PilotPNCurrent to the PilotPN of sector k.

OSI2SequenceNum is a feature that can allow a terminal to accumulate a second type of OSI communication, referred to herein as an OSI2 command, OSI2 commands can be transmitted to terminals when relatively high levels of interference are observed. Generally, the terminal can adjust power by a predetermined step size. When a terminal receives multiple OS2 commands, the steps are accumulated causing a more rapid adjustment to transmit power levels. The access terminal can update OSI2SequenceNum as follows:

$$OSI2SequenceNum = \begin{cases} OSI2SequenceNum + 1 & \text{if } PilotPNCurrent = PilotPNStrongest \\ & \text{and } OSI2SequenceNum \leq \\ & OSI2SequenceNumMax - 1 \text{ and} \\ & OSIStrongest = 2 \\ 2 & \text{if } PilotPNCurrent \neq PilotPNStrongest \text{ and} \\ & OSIStrongest = 2 \\ 1 & \text{otherwise} \end{cases}$$

Here, OSI2SequenceNumMax is a configuration attribute of the power control protocol. In addition, PilotPNStrongest can be updated as follows:

$$PilotPNStrongest = \begin{cases} PilotPNCurrent, & \text{if } OSIStrongest = 2 \\ -1, & \text{otherwise} \end{cases}$$

The access terminal can increase RDCHGain by DataGainStepUp dB if $D_w$ is greater than RDCHGainAdjustmentThreshold and shall decrease RDCHGain by DataGainStepDown*OSI2SequenceNum dB if $D_w$ is less than or equal to RDCHGainAdjustmentThreshold. Here, DataGainStepUp, DataGainStepDown, and RDCHGainAdjustmentThreshold are configuration attributes of the power control protocol. Furthermore, the RDCHGain can be limited by RDCHGainMin and RDCHGainMax. That is, the access terminal can set RDCHGain to RDCHGainMin if the resulting RDCHGain is smaller than RDCHGainMin and to RDCHGainMax if the resulting RDCHGain is larger than RDCHGainMax.

Figure 8:
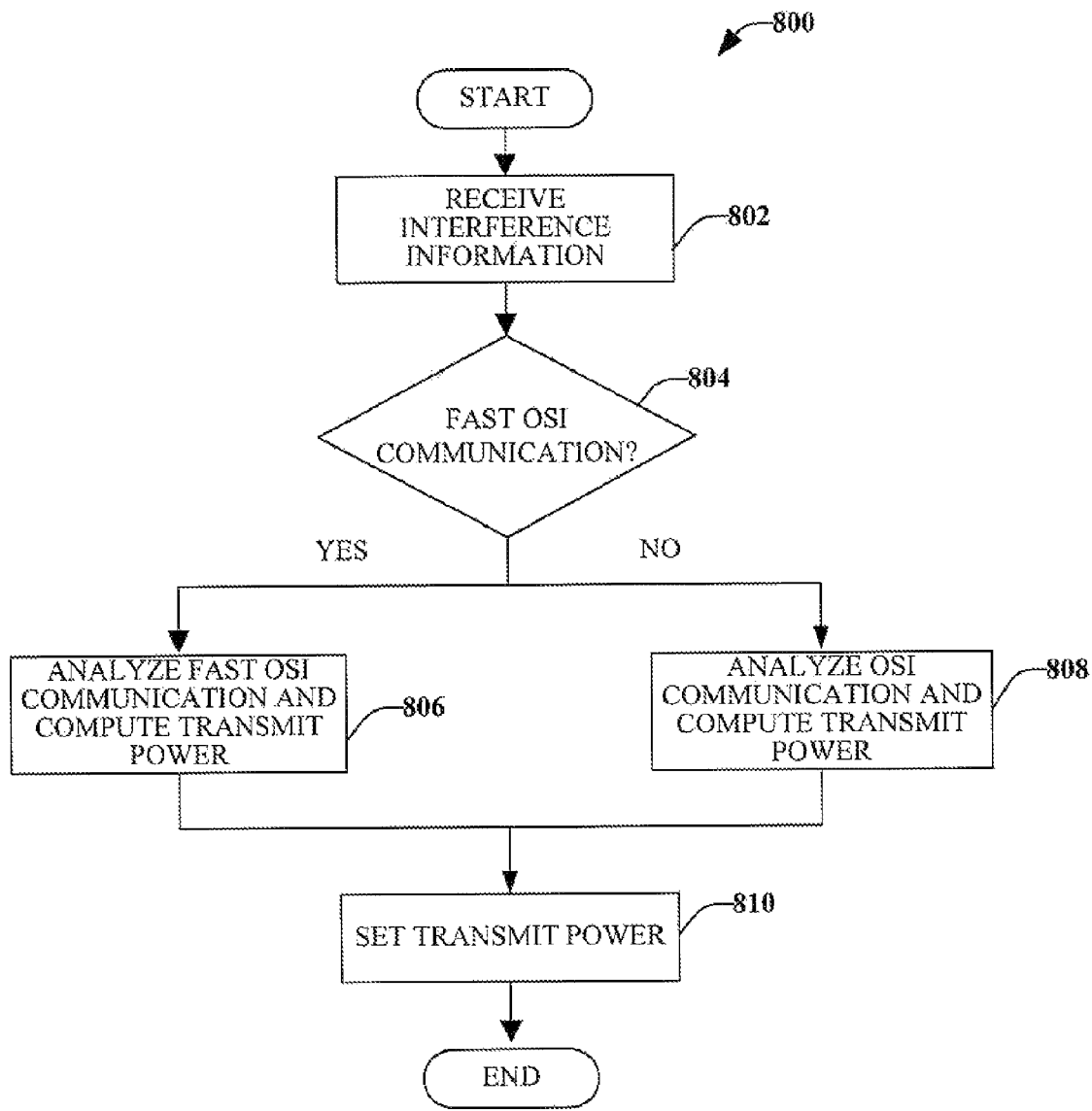
FIG. 8 illustrates a methodology for controlling transmission power for a terminal based upon interference information in accordance with one or more aspects presented herein.

Referring now to FIG. 8, another methodology 800 for controlling transmission power and mitigating interference is illustrated. In the methodologies illustrated above, die same power control algorithms are utilized for both OSI and fast OSI communications. However, behavior of power control mechanisms for a terminal can be controlled separately for OSI communications and fast OSI communications.

At reference numeral 802, interference, information is provided in an OSI communication or fast OSI communication. The interference information can be received on two separate channels, where the first channel provides interference information at a relatively high rate and low power (e.g., fast OSI communication) and the second channel provides interference information, at a relatively low rate and high power (e.g., OSI communication).

At reference numeral 804, a determination is made as to whether the received interference information was provided in a fast OSI communication. If yes, processing continues at reference numeral 806, where the fast OSI communication is analyzed and transmit power is computed. If no, processing continues at reference numeral 808, where the OSI communication is analyzed and transmit power can be computed. Analysis methodologies, algorithms, thresholds and the like can differ for OSI and fast OSI communications. For example, different sets of parameters or thresholds can be utilized. In addition, transmit power can be adjusted in a series of steps to provide for gradual change in transmit power. Step size for fast OSI communications can vary from step size used for OSI communications.

At reference numeral 810, the transmit power can be set or adjusted based upon, the analysis interference information. If interference is not considered significant, the transmit power may remain at the same power level as previous transmissions.

It will be appreciated that inferences can be made regarding transmission power, formats, frequencies, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences regarding observed interference, analysis of interference information and power level requirements. Inferences can also be made regarding battery life, channel strength and the like.

Figure 9:
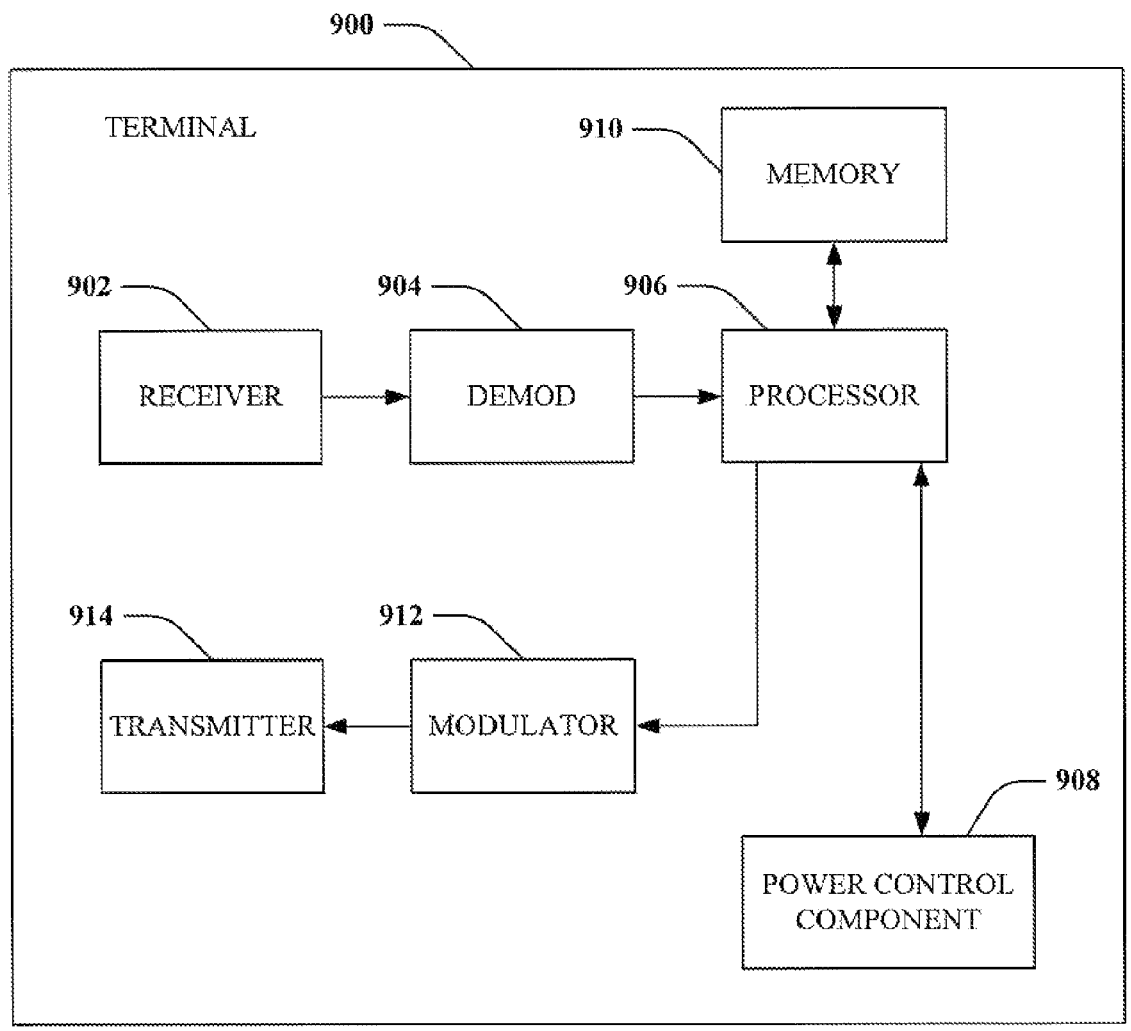
FIG. 9 illustrates a system that utilizes interference information to set transmit power for a terminal in accordance with one of more aspects presented herein.

FIG. 9 is an illustration of a terminal or user device 900 that provides for mitigation of interference in a wireless communication environment in accordance with one or more aspects set forth herein. Terminal 900 comprises a receiver 902 that receives a signal, performs typical actions (e.g., filters, amplifies, downconverts, etc.) the received signal and digitizes the conditioned signal to obtain samples. A demodulator 904 can demodulate the samples and provide received pilot symbols to a processor 906.

Processor 906 can be a processor dedicated to analyzing information received by receiver component 902 and/or generating information for transmission by a transmitter 914. Processor 906 can be a processor that controls one or more components of terminal 900, and/or a processor that analyzes information received by receiver 902, generates information for transmission by a transmitter 914, and controls one or more components of terminal 900. Processor 906 can utilize any of the methodologies described herein. Including those described with respect to FIGS. 4-8, to determine transmission power.

In addition, terminal 900 can include a power control component 90S that analyzes received input, including interference information obtained from a non-serving sector, and determines transmission power. Power control component 908 may be incorporated into the processor 906. Power control component 908 can utilize interference information provided in OSI communication and/or a fast OSI communication, OSI communications and fast OSI communications from multiple non-serving sectors can be used in combination to compute transmit power for terminal 900. In addition, power control component 908 can additional utilize information regarding previous transmit power levels, device information battery power) and the like to determine transmit power.

It is to be appreciated that power control component 908 can include power analysis code drat performs utility based analysis in connection with determining transmission power. The power analysis code can utilize artificial intelligence based methods in connection with performing inference and/or probabilistic determinations and/or statistical-based determinations in connection with optimizing transmission power. Power analysis code can utilize different analysis procedures depending upon the manner in which the interference information is provided. For example, a first set of parameters, thresholds and/or step size can be utilized to process OSI communications and a second, separate set of parameters, thresholds and/of step sizes can be utilized to analyze fast OSI communications.

Terminal 900 can additionally comprise memory 910 that is operatively coupled to processor 906 and that can store information related to transmission power, OSI communications, fast OSI communications, methods for determining transmission power, lookup tables comprising thresholds, parameters, step size and information related thereto, and any other suitable information related to interference analysis and adjustment of transmission power as described herein. It will be appreciated that the data store (e.g., memories) components described herein can be either-volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 910 of the subject systems and methods is intended to comprise, without being limited to, these and any other suitable types of memory. Processor 906 is connected to a symbol modulator 912 and transmitter 914 that transmits the modulated signal.

Figure 10:
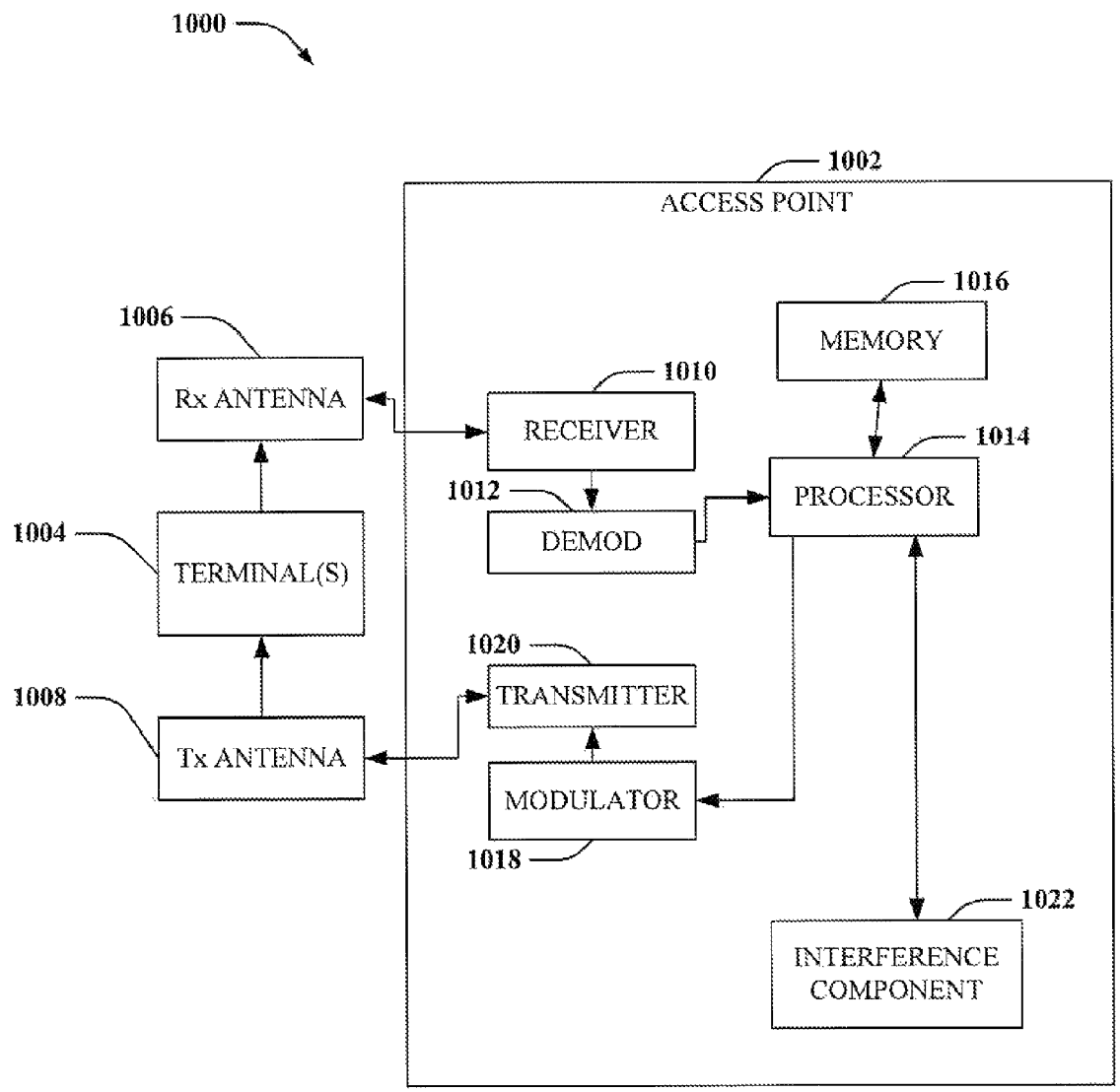
FIG. 10 illustrates a system that transmits interference information for a terminal in accordance with one or more aspects presented herein.

FIG. 10 is an illustration of a system 1000 that facilitates transmission power control in a communication environment in accordance with various aspects. System 1000 comprises an access point 1002 with a receiver 1010 that receives signal(s) from one or more terminals 1004 through one or more receive antennas 1006, and transmits to the one or more terminals 1004 through a plurality of transmit antennas 1008. In one or more aspects, receive antennas 1006 and transmit antennas 1008 can be implemented using a single set of antennas. Receiver 1010 can receive information from receive antennas 1006 and is operatively associated with a demodulator 1012 that demodulates received information. Receiver 1010 can be, for example, a Rake receiver (e.g., a technique that individually processes multi-path signal components using a plurality of baseband correlators, . . . ), an MMSE-based receiver, or some other suitable receiver for separating out terminals assigned thereto, as will be appreciated by one skilled in the art. According to various aspects, multiple receivers can be employed (e.g., one per receive antenna), and such receivers can communicate with each other to provide improved estimates of user data. Demodulated symbols are analyzed by a processor 1014 that is similar to the processor described above with regard to FIG. 9, and is coupled to a memory 1016 that stores information related to interference, transmission power levels, and the like. Receiver output for each antenna can be jointly processed by receiver 1010 and/or processor 1014. A modulator 1018 can multiplex the signal for transmission by a transmitter 1020 through transmit antennas 1008 to terminals 1004.

Access point 1002 further comprises an interference component 1022, which can be a processor distinct from, or integral to, processor 1014. Interference component 1022 can evaluate observed interference data, estimate interference and generate OSI communications and/or fast OSI communications for one or more terminals supported by neighboring sectors. It is to be appreciated that interference component 1022 can include interference analysis code that performs utility based analysis in connection with determining OSI communications and fast OSI communications. The interference analysis code can include separate and distinct, analysis procedures for generating OSI communications and fast OSI communications. The interference analysis code can utilize artificial intelligence based methods in connection with performing inference and/or probabilistic determinations and/or statistical-based determinations in connection with mitigating interference.

Figure 11:
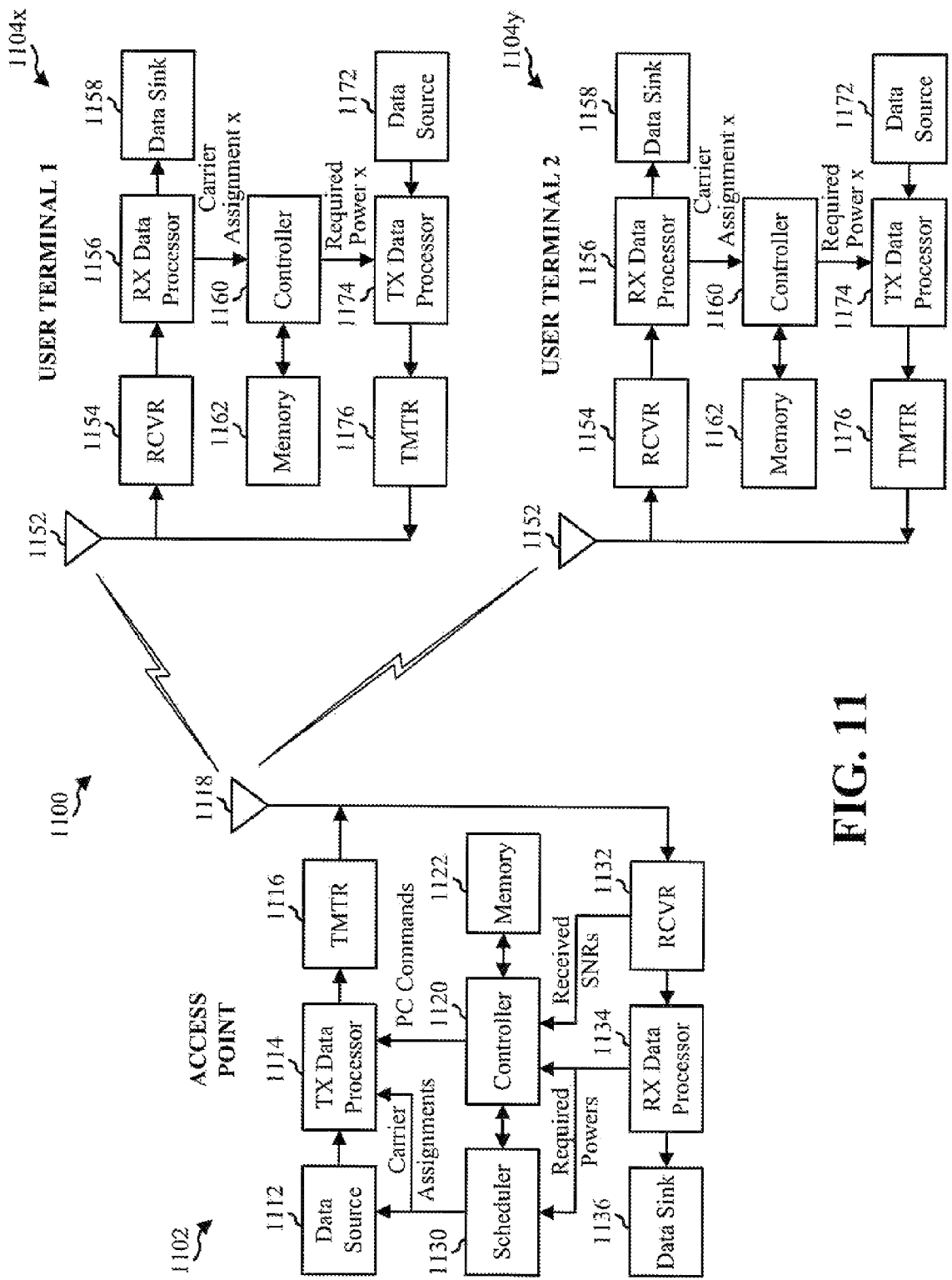
FIG. 11 is an illustration of a wireless communication environment that can be employed in conjunction with the various systems and methods described herein.

FIG. 11 shows an exemplary wireless communication system 1100. The wireless communication system 1100 depicts one access point and two terminals for sake of brevity. However, it is to be appreciated that the system can include more than one access point and/or one or more terminals, wherein additional access points and/or terminals can be substantially similar or different from, the exemplary access point and terminals described below. In addition, it is to be appreciated that the access point and/or the terminals can employ the systems (FIGS. 1-3, 9 and 10) and/or methods (FIGS. 4-8) described herein.

FIG. 11 shows a block diagram of an access point 1102 and two terminals 1104x and 1104y in multiple-access multi-carrier communication system 1100. At access point 1102, a transmit (TX) data processor 1114 receives traffic data (i.e., information hits) from a data source 1112 and signaling and other information from a controller 1120 and a scheduler 1130. For example, controller 1120 may provide interference information included in OSI communications and fast OSI communications used to adjust the transmit power of terminals supported by other sectors. Scheduler 1130 may provide assignments of carriers for active, supported terminals within the sector of access point 1102. Additionally, a memory 1122 can maintain information regarding interference data observed within the sector. The various types of data (e.g., interference information and assignment information) may be sent on different transport channels. TX data processor 1114 encodes and modulates the received data using multi-carrier modulation (e.g., OFDM) to provide modulated data (e.g., OFDM symbols). A transmitter unit (TMTR) 1116 then processes the modulated data to generate a downlink modulated signal that is then transmitted from an antenna 1118. Interference information can be transmitted on two, distinct channels. In particular, OSI communications can be transmitted at a slow rate and high power level, while fast OSI communications can be transmitted at a higher rate and lower power level.

At each of terminals 1104x and 1104y, the transmitted and modulated signals are received by an antenna 1152 and provided to a receiver unit (RCVR) 1154. Receiver unit 1154 processes and digitizes the received signal to provide samples. A received (RX) data processor 1156 then demodulates and decodes the samples to provide decoded data, which may include interference information, recovered traffic data, messages, signaling, and so on. The traffic data may be provided to a data sink 1158, and the Fast and/or Slow interference information for the terminal is provided to a controller 1160.

Controller 1160 directs data transmission on the uplink using the specific carriers that have been assigned to the terminal and indicated in the received carrier assignment. Controller 1160 further adjusts the transmit power used for the uplink transmissions based on the received Fast and Slow interference information. A memory 1162 can maintain information regarding previous interference information and/or other transmit power related information.

For each active terminal 1104x and 1104y, a TX data processor 1174 receives traffic data from a data source 1172 and signaling and other information from controller 1160. For example, controller 1160 may provide information indicative of the required transmit power, the maximum transmit power, or the difference between the maximum and required transmit powers for the terminal. The various types of data are coded and modulated by TX data processor 1174 using the assigned carriers and further processed by a transmitter unit 1176 to generate an uplink modulated signal that is then transmitted from antenna 1152.

At access point 1102, the transmitted and modulated signals from active, supported terminals are received by antenna 1118, processed by a receiver unit 1132, and demodulated and decoded by an RX data processor 1134. In addition, interference caused by transmission for terminals 1104x and 1104y supported by other sectors can be monitored and/or estimated. The decoded signals can be provided to a data sink 1136. Controller 1120 can derive interference information and generate OSI communications and/or fast OSI communications. RX data processor 1134 provides the recovered feedback information (e.g., the required transmit power) for terminals supported by the access point 1102 to controller 1120 and scheduler 1130.

Scheduler 1130 uses tire feedback information to perform a number of functions such as (1) selecting a set of terminals for data transmission on the reverse link and (2) assigning carriers to the selected terminals. The carrier assignments for the scheduled terminals are then transmitted on the forward link to these terminals.

The techniques described herein may be implemented by various means. For example, these techniques may be implemented in hardware, software, or a combination thereof. For a hardware implementation, the processing units (e.g., controllers 1120 and 1160, TX and RX processors 1114 and 1134, and so on) for these techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Figure 12:
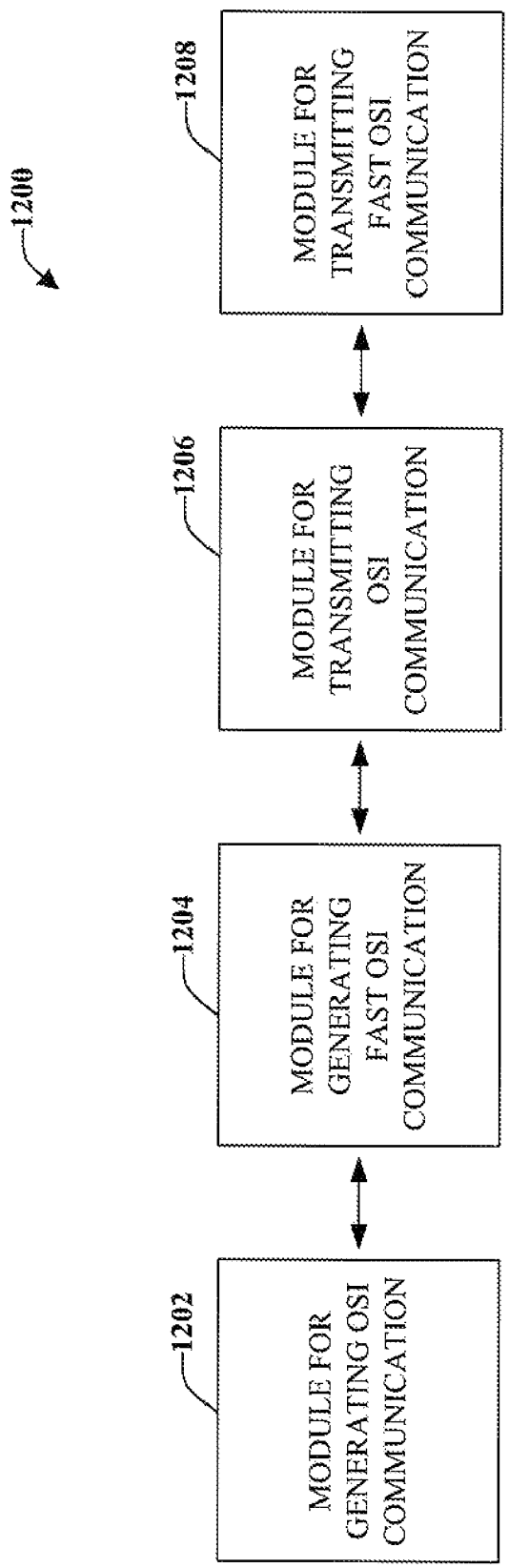
FIG. 12 is an illustration of a system that facilitates mitigation of interference in accordance with one or more aspects presented herein.

Referring now to FIG. 12, a system 1200 for regulating interference is illustrated. System 1200 can include a module 1202 for generating an OSI communication, and a module 1204 for generating a fast OSI communication. Both OSI communications and fast OSI communications can be generated based upon interference observed, estimated or computed for a sector. Module 1202 for generating an OSI communication and module 1204 for generating a fast OSI communication can utilize the same procedures or algorithms to generate interference communications. Alternatively, each of the modules 1202 and 1204 can utilize a separate algorithm, set of parameters and/or threshold in generating interference communications.

System 1200 can also include a module 1206 for transmitting OSI communications and a module 1208 for transmitting fast OSI communications. Module 1206 for transmitting OSI communications can utilize a channel designated for interference information (e.g., F-OSICH) intended to reach a broad coverage area, Module 1208 for transmitting fast OSI communications can utilize a channel that transmits at a faster rate and lower power. In particular, module 1208 can utilize an assignment channel (e.g., F-SSCH) to transmit fast OSI communications to terminals in neighboring sectors.

Figure 13:
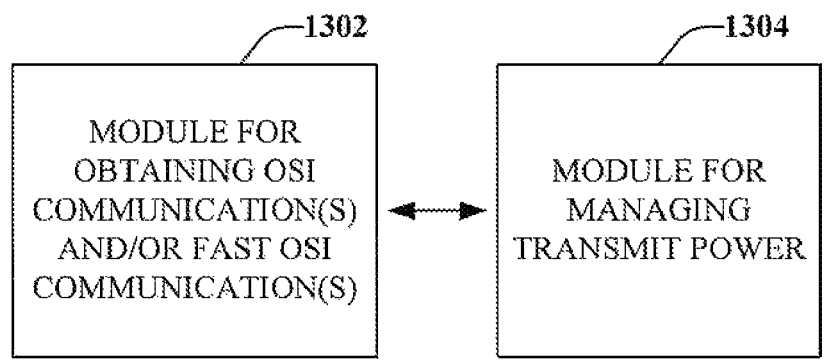
FIG. 13 is an illustration of a system that facilitates control of transmission power for mitigation of interference in accordance with one or more aspects presented herein.

Turning now to FIG. 13, a system 1300 for controlling transmit power of terminals to mitigate interference is illustrated. System 1300 can include a module for obtaining OSI communications and/or fast OSI communications. The OSI communications and/or fast OSI communications can include information regarding the observed or estimated amount of interference for a neighboring sector. The OSI communications and/or fast OSI communications can be obtained on separate channels, where OSI communication channel transmits at a slower periodic rate and higher power than the fast OSI communication channel.

System 1300 can also include a module 1304 for managing transmit power of a terminal as a function of received OSI communications and/or fast OSI communications, Module 1304 can perform separate analysis of OSI communications and fast OSI communications and adjust, the transmit power of the terminal independently for the different types of interference communications.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for controlling interference, comprising:
   transmitting a first interference communication from an access point to a terminal in a neighboring sector; and
   transmitting a second interference communication from the access point to the terminal, wherein the second interference communication is transmitted at a higher periodic rate than the first interference communication.

2. The method of claim 1, the first and second interference communications are based at least in part upon interference data for a sector and transmit power for at least one terminal in a neighboring sector is adjusted as a function of the first interference communication and the second interference communication.

3. The method of claim 1, further comprising:
   generating the first interference communication and the second interference communication as a function of interference data for a sector; and
   comparing the interference data to a threshold, transmission of the first interference communication and the second interference communication is controlled based upon the comparison.

4. The method of claim 1, further comprising:
   generating the first interference communication as a function of a first analysis of interference data; and
   generating the second interference communication as a function of a second analysis of the interference level, the first analysis and the second analysis are distinct.

5. The method of claim 4, the first interference communication is a function of long term interference level.

6. The method of claim 4, the second interference communication is a function of short term of interference level.

7. The method of claim 4, the first analysis utilizes a first threshold to control transmission of the first interference communication and the second analysis utilizes a second threshold to control transmission of the second interference communication, the first threshold and the second threshold are distinct.

8. The method of claim 1, the first interference communication transmitted via a designated channel and the second interference communication transmitted via a resource assignment channel.

9. A method of controlling terminal transmit power in a wireless environment, comprising:
   receiving a first interference communication from a neighboring sector;
   receiving a second interference communication from the neighboring sector, the second interference communication is transmitted at higher periodic rate and lower power than the first interference communication; and
   regulating transmit power for a terminal supported by a sector based at least in part upon the first interference communication and/or the second interference communication.

10. The method of claim 9, the second interference communication is received in a resource assignment channel and the neighboring sector is within a set of active sectors of the terminal.

11. The method of claim 9, further comprising:
    performing a first analysis of the first interference communication; and
    performing a second analysis of the second interference communication, regulation of the transmit power is a function of the first analysis and/or the second analysis, the first analysis and the second analysis are distinct.

12. The method of claim 11, the first analysis utilizes a first set of parameters and the second analysis utilizes a second set of parameters.

13. The method of claim 11, the second analysis performed on the second interference communication includes evaluating channel strength.

14. An apparatus that facilitates controlling interference, comprising:
    a processor that executes instructions for transmitting first interference communication on a first channel and second interference communication using a second channel, wherein the first interference communication and second interference communication are transmitted from an access point in a neighboring sector, and further wherein the second channel has a higher periodic rate than the first channel; and a memory that stores interference data for a sector, the first interference communication and second interference communication are based at least in part upon the interference data.

15. The apparatus of claim 14, transmit power level for a terminal supported by a neighboring sector is modified as a function of the first interference communication and the second interference communication.

16. The apparatus of claim 14, the processor further executes instructions for:
determining the first interference communication as a function of a first evaluation procedure for the interference data; and
determining the second interference communication as a function of a second evaluation procedure for the interference data, the first evaluation procedure and the second evaluation procedure are independent.

17. The apparatus of claim 16, the first evaluation procedure utilizes a first limit to manage transmission of the first interference communication and the second evaluation procedure utilizes a second limit to manage transmission of the second interference, communication, the first limit and the second limit are independent.

18. The apparatus of claim 14, the processor further executes instructions for:
determining, the first interference communication as a function of long-term interference level; and
determining the second interference communication as a function of short-term interference level.

19. The apparatus of claim 14, the first channel is designated for transmission of interference information and the second channel is a resource assignment channel.

20. An apparatus that facilitates controlling interference, comprising:
a memory that stores information associated with transmit power of a terminal; and
a processor that executes instructions for determining the transmit power based upon a first interference communication and a second interference communication, from a non-serving sector, the second interference communication is transmitted at a higher periodic rate than the first interference communication.

21. The apparatus of claim 20, the non-serving sector is within an active set of the terminal.

22. The apparatus of claim 20, the processor further executes instructions for:
analyzing the first interference communication utilizing a first evaluation procedure; and
analyzing the second interference communication utilizing a second evaluation procedure, the first evaluation procedure and the second evaluation procedure are separate.

23. The apparatus of claim 20, the memory stores a first, set of parameters and a second set of parameters, the first evaluation procedure utilizes the first set of parameters and the second evaluation procedure utilizes the second set of parameters.

24. The apparatus of claim 20, the second evaluation procedure is based at least in part upon channel strength of the second interference communication.

25. An apparatus that facilitates control of interference, comprising:
means for generating a first interference output;
means for generating a second interference output;
means for transmitting, from a neighboring sector, the first interference output on a first channel; and
means for transmitting, from the neighboring sector, the second interference output on a second channel, the second channel is at a higher periodic rate than the first channel, the first interference output and the second interference output are used to manage transmit power for a terminal in the neighboring sector.

26. The apparatus of claim 25, further comprising means for utilizing a first computation in generation of the first interference output and a second computation in generation of the second interference output, the first computation and the second computation are distinct.

27. The apparatus of claim 25, further comprising:
means for comparing the first interference output to a threshold, transmission of the first interference output is a function of the comparison; and
means for comparing the second interference output to a threshold, transmission of the second interference output is a function of the comparison.

28. The apparatus of claim 25, the first interference output is a function of long-term interference level and the second interference output is a function of short-term interference level.

29. An apparatus that facilitates mitigating interference, comprising:
means for obtaining a first interference output and a second interference output from a non-serving sector, wherein the second interference output is obtained at a higher periodic rate than the first interference output; and
means for managing transmit power of a terminal as a function of the first interference output and/or the second interference output.

30. The apparatus of claim 29, the non-serving sector is within a set of active sectors of the terminal.

31. The apparatus of claim 29, further comprising:
means for performing a first analysis of the first interference output; and
means for performing a second analysis of the second interference output, the first analysis and the second analysis are distinct.

32. A non-transitory computer-readable medium having instructions for;
transmitting first other sector interference output from a neighboring sector to a terminal; and
transmitting second other sector interference output from the neighboring sector to the terminal, the first other sector interference output is transmitted at a lower periodic rate than the second other sector interference output and transmit power level is regulated based upon the first other sector interference output and the second other sector interference output.

33. The non-transitory computer-readable medium of claim 32, the instructions further comprising:
generating the first other sector interference, output as a function of a first evaluation of amount of interference observed by a sector; and
generating the second other sector interference output as a function of a second evaluation of the amount of interference observed by the sector, the first evaluation is independent of the second evaluation.

34. The non-transitory computer-readable medium of claim 33, the first evaluation includes comparison of the amount of interference to a first threshold, the second evaluation includes comparison of the amount of interference to a second threshold, the first threshold is independent of the second threshold.

35. The non-transitory computer-readable medium of claim 32, the/first other sector interference output and the second other sector interference output are functions of interference level.

36. The non-transitory computer-readable medium of claim 32, the second other sector interference output is a segment within a resource assignment channel.

37. A non-transitory computer-readable medium having instructions for:
obtaining a first other sector interference output from a non-serving sector;
obtaining a second other sector interference output from the non-serving sector; and
managing transmit power for a terminal based at least in part upon the first other sector interference output and the second other sector interference, the second other sector interference output is obtained at a higher periodic rate than the first other sector interference output.

38. The non-transitory computer-readable medium of claim 37, the instructions further comprising:
adjusting the transmit power based at least in part upon a first analysis of the first other sector interference output; and
adjusting the transmit power based at least in part upon a second analysis of the second other sector interference output.

39. The non-transitory computer-readable medium of claim 38, the first analysis is distinct from the second analysis.

40. The non-transitory computer-readable medium of claim 38, the second analysis evaluates the channel strength of the second other sector interference output.

41. A processor that executes computer-executable instructions that facilitate mitigation of interference, the instructions comprising:
transmitting, from a neighboring sector, a first interference communication based at least in part upon amount of interference observed by a sector; and
transmitting, from the neighboring sector, a second interference communication based at least in part upon the amount of interference, the first interference communication is transmitted on a first channel and the second interference, communication is transmitted on a second channel, the second channel has a higher periodic transmission rate than the first channel, transmit power of a terminal supported by a neighboring sector is controlled based at least in part upon the first interference communication and the second interference communication.

42. The processor of claim 41, the instructions further comprising:
generating the first interference communication as a function of a first evaluation procedure; and
generating the second interference communication as a function of a second evaluation procedure.

43. The processor of claim 42, the first evaluation procedure is independent of the second evaluation procedure.

44. The processor of claim 42, the first channel is designated for transmission of other sector interference and the second channel is a resource assignment channel.

45. A processor that executes computer-executable instructions mat facilitate mitigation of interference, the instructions comprising:
receiving a first interference communication based at least in part upon amount of interference observed by a neighboring sector;
receiving a second interference communication based at least in part upon the amount of interference, wherein the second interference communication is received at a higher periodic rate than the first interference communication; and
performing a first adjustment of the transmission power of a terminal supported by a sector as a function of the first interference communication; and
performing a second adjustment the transmission power of the terminal as a function of the second interference communication.

46. The processor of claim 45, the first adjustment is distinct from the second adjustment.

47. The processor of claim 45, the second interference communication is received from the access point within the active set of the terminal.

48. The process of claim 45, the second adjustment includes an evaluation of the channel strength of the second interference communication.

49. The method of claim 1, wherein the second interference communication is transmitted at a lower power than the first interference communication.

* * * * *